United States Patent
Jones

(10) Patent No.: US 12,378,931 B2
(45) Date of Patent: Aug. 5, 2025

(54) HYDRAULICALLY ACTUATED MECHANICAL LOCK ASSEMBLY

(71) Applicant: Goodrich Actuation Systems Limited, Solihull (GB)

(72) Inventor: Tony Jones, Birmingham (GB)

(73) Assignee: GOODRICH ACTUATION SYSTEMS LIMITED, West Midlands (GB)

( * ) Notice: Subject to any disclaimer, the term of this patent is extended or adjusted under 35 U.S.C. 154(b) by 0 days.

(21) Appl. No.: 14/707,518

(22) Filed: May 8, 2015

(65) Prior Publication Data

US 2016/0001889 A1 Jan. 7, 2016

(30) Foreign Application Priority Data

Jul. 7, 2014 (EP) .................................... 14176005

(51) Int. Cl.
*F02K 1/76* (2006.01)
*B64D 33/04* (2006.01)
(Continued)

(52) U.S. Cl.
CPC .............. *F02K 1/766* (2013.01); *B64D 33/04* (2013.01); *F02K 1/70* (2013.01); *F02K 1/76* (2013.01);
(Continued)

(58) Field of Classification Search
CPC . B64D 33/04; F02K 1/766; F02K 1/76; F05D 2270/164; F16K 35/00;
(Continued)

(56) References Cited

U.S. PATENT DOCUMENTS

2004/0006980 A1* 1/2004 Berthod ................ E02F 9/2207
60/413
2005/0072144 A1* 4/2005 Bitter ..................... F15B 1/021
60/413

FOREIGN PATENT DOCUMENTS

FR 2926117 A1 1/2008
GB 2026407 A 2/1980
(Continued)

OTHER PUBLICATIONS

European Patent Office Search Report; Application No. 14176005. 8-1607; Dated Jan. 22, 2015; 6 pages.

*Primary Examiner* — Kyle Robert Thomas
(74) *Attorney, Agent, or Firm* — CANTOR COLBURN LLP

(57) ABSTRACT

A hydraulically actuated mechanical lock assembly, including a lock actuator comprising a lock housing and a moveable element mounted in the lock housing, wherein the housing is arranged to receive hydraulic fluid at a first end (Chamber A) from a source of high pressure fluid via a return line, and at a second end (Chamber B) from a source of high pressure fluid via a control line, whereby the relative pressures in Chambers A and B are controlled, via the control line, to cause movement of the moveable element between a locked position and an unlocked position; and a lock valve arranged between the return line and the control line to control the flow of hydraulic fluid into Chambers A and B; wherein the return line is configured to be connected between the source of high pressure fluid and the lock valve via chamber A of the lock actuator.

4 Claims, 2 Drawing Sheets

(51) Int. Cl.
    *F02K 1/70*           (2006.01)
    *F15B 11/024*       (2006.01)
    *F15B 13/02*        (2006.01)
    *F15B 20/00*        (2006.01)
    *F16K 35/00*        (2006.01)

(52) U.S. Cl.
    CPC .......... F15B 11/024 (2013.01); F15B 13/021 (2013.01); F15B 20/005 (2013.01); F16K 35/00 (2013.01); *F05D 2260/38* (2013.01); *F05D 2270/64* (2013.01); *F15B 2211/863* (2013.01)

(58) Field of Classification Search
    CPC .... F15B 11/024; F15B 13/021; F15B 20/005; F15B 2211/863
    USPC ................. 251/89, 89.5, 94; 137/596, 625.2
    See application file for complete search history.

(56) References Cited

FOREIGN PATENT DOCUMENTS

| | | | | |
|---|---|---|---|---|
| GB | 2082800 A | 3/1982 | | |
| WO | 0157382 A3 | 8/2001 | | |
| WO | WO 0157382 A2 * | 8/2001 | ............. | F02K 1/766 |
| WO | WO-2011009527 A1 * | 1/2011 | ............ | F15B 11/024 |

\* cited by examiner

HYDRAULICALLY ACTUATED MECHANICAL LOCK ASSEMBLY

CROSS REFERENCE TO RELATED APPLICATIONS

This application claims priority to European Patent (EP) Application No. 14176005.8 filed Jul. 7, 2014, the entire contents of which are incorporated herein by reference.

TECHNICAL FIELD

The present invention relates to locks for thrust reverser systems.

BACKGROUND

Thrust reversers are used in aircraft to provide additional deceleration to the aircraft, for example on landing. A thrust reverser is generally, during flight, stowed or not active. When deployed, the thrust reverser acts to redirect the backwards thrust of the aircraft engine to a forward direction to slow the aircraft.

Generally a thrust reverser includes cowls that, in the stowed position, lie flat. Actuators, such as hydraulic actuators, cause the cowls to lift, on deployment, to cause redirection or reversal of the thrust. A controller, which again is commonly a hydraulic control, controls operation of the actuators.

Thrust reversers should generally not be deployed in flight. Erroneous deployment can be catastrophic and safety systems are required to prevent this. In particular, thrust reversers are provided with locks to secure the thrust reverser in the stowed position.

Commonly, thrust reversers are provided with hydraulic lock systems which are mounted on or in relation to the thrust reverser actuators. Such lock systems generally include an actuator means having a moveable element, e.g. a piston or bellows, responsive to hydraulic pressure to put the lock in the locked or unlocked position. The lock is, for increased safety, default biased to the locked position by means of, e.g., a biasing spring.

The lock is provided with a lock valve, operation of which is controlled by the thrust reverser control circuit. When the control circuit receives a command to deploy or stow the thrust reverser, it will also provide a command to the lock valve to unlock or lock the lock. The lock valve responds to control signals by selectively increasing or decreasing the pressure of hydraulic fluid supplied to the lock actuator means to cause the moveable element to move to the locked or unlocked position. Lock systems that operate in this way are commonly known as Track locks. There are also mechanical locks within each of the actuators, which are actuated by the pressure in the piston head volume, and are biased closed by springs as with the Track lock. Track locks are generally referred to as secondary or tertiary locks, because they provide an additional line of defence for the system to account for possible failures within the actuator (primary) locks.

FIG. 1 is a schematic view of a known lock assembly.

The lock assembly is arranged to be mounted on a nacelle structure, with the locking element interfacing with the moving cowls. The lock assembly shown includes a piston (3) biased by a spring (6), but other known hydraulic lock assemblies could be used, for example bellow-type systems or the like that control movement of the locks between the locked and unlocked positions in response to hydraulic pressure.

The spring (6) biases the moveable piston (3) to a normally locked position.

The lock assembly is coupled to the thrust reverser control circuit 10. When the control circuit receives a command to activate or stow the thrust reverser cowls, the track lock valve switches, accordingly, to control the hydraulic fluid in the control line.

If commanded to unlock the lock, the lock valve (7) switches to provide supply pressure to chamber B, via the control line (5) to increase the pressure to act against the spring (6) to move the piston (3) in the unlocked direction. If the system is commanded to lock the lock, the high return pressure provided to chamber A, via the return line (4), together with the spring bias, ensures that the piston remains in a locked direction or position.

A problem with such hydraulically actuated mechanical locks is that they can be subject to transient forces e.g. if bursts occur within hydraulic lines in the system, e.g. during flight. Such forces may inadvertently drive unlocking of the locks, depending on the position of the burst.

This problem can be explained with reference to FIG. 1, where a rupture occurs in the return line (4). In the conventional lock the return line (4) is attached, at one end, to the "primary lock return chambers" which contain a large volume of fluid at high pressure from the aircraft systems. This line is connected to the lock via the lock valve (7).

If this line ruptures at the location of the X the high pressure fluid from chamber A and from the return chambers quickly flows to the rupture and escapes at the rupture and the pressure in chamber A will quickly fall to atmospheric pressure. The pressure in the lock valve will be high while the high system pressure fluid flows to the rupture and this will cause the pressure in the control line (5) from the valve to chamber B to increase. This will allow the piston to move against the spring force in the unlocking direction, causing the lock to release.

The aim of the present invention is to provide a lock with improved integrity of locking in the case of such ruptures. Such ruptures can occur for many reasons, both under "normal" pressures and also high pressures caused by faults or failure, e.g. due to a hydraulic system blockage.

SUMMARY

Accordingly, the invention provides a hydraulically actuated mechanical lock assembly, comprising: a lock actuator 1 comprising a lock housing 2 and a moveable element 3 mounted in the lock housing, wherein the housing 2 is arranged to receive hydraulic fluid at a first end (Chamber A) from a source of high pressure fluid via a return line 4', and at a second end (Chamber B) from a source of high pressure fluid via a control line 5, whereby the relative pressures in Chambers A and B are controlled, via the control line, to cause movement of the moveable element between a locked position and an unlocked position; and a lock valve 7 arranged between the return line 4 and the control line 5 to control the flow of hydraulic fluid into Chambers A and B; wherein the return line 4' is configured to be connected between the source of high pressure fluid and the lock valve via chamber A of the lock actuator.

BRIEF DESCRIPTION OF THE DRAWINGS

Preferred embodiments will now be described by way of example only, with reference to the drawings.

DETAILED DESCRIPTION

Operation of the lock, for the conventional system, has been described above. The general operation of the lock of FIG. 2 is largely the same.

The lock valve is responsive to a control circuit to switch connection of the hydraulic lines to cause locking and unlocking of the lock as describe above. The lock valve is usually an electrical solenoid operated hydraulic valve, which is signalled from a fully independent electronic control circuit. This is necessary to prevent faults within the engine control from having the authority to unlock both the primary and secondary locking elements.

In the conventional system, the path of the return line is from the return chambers, to chamber A of the lock actuator. In one embodiment, a component block containing the Track lock valve has a direct flow path which permanently connects chamber A to the system return lines, and does not get affected by switching of the valve. A rupture at X can cause inadvertent unlocking as described above.

Figure 2:
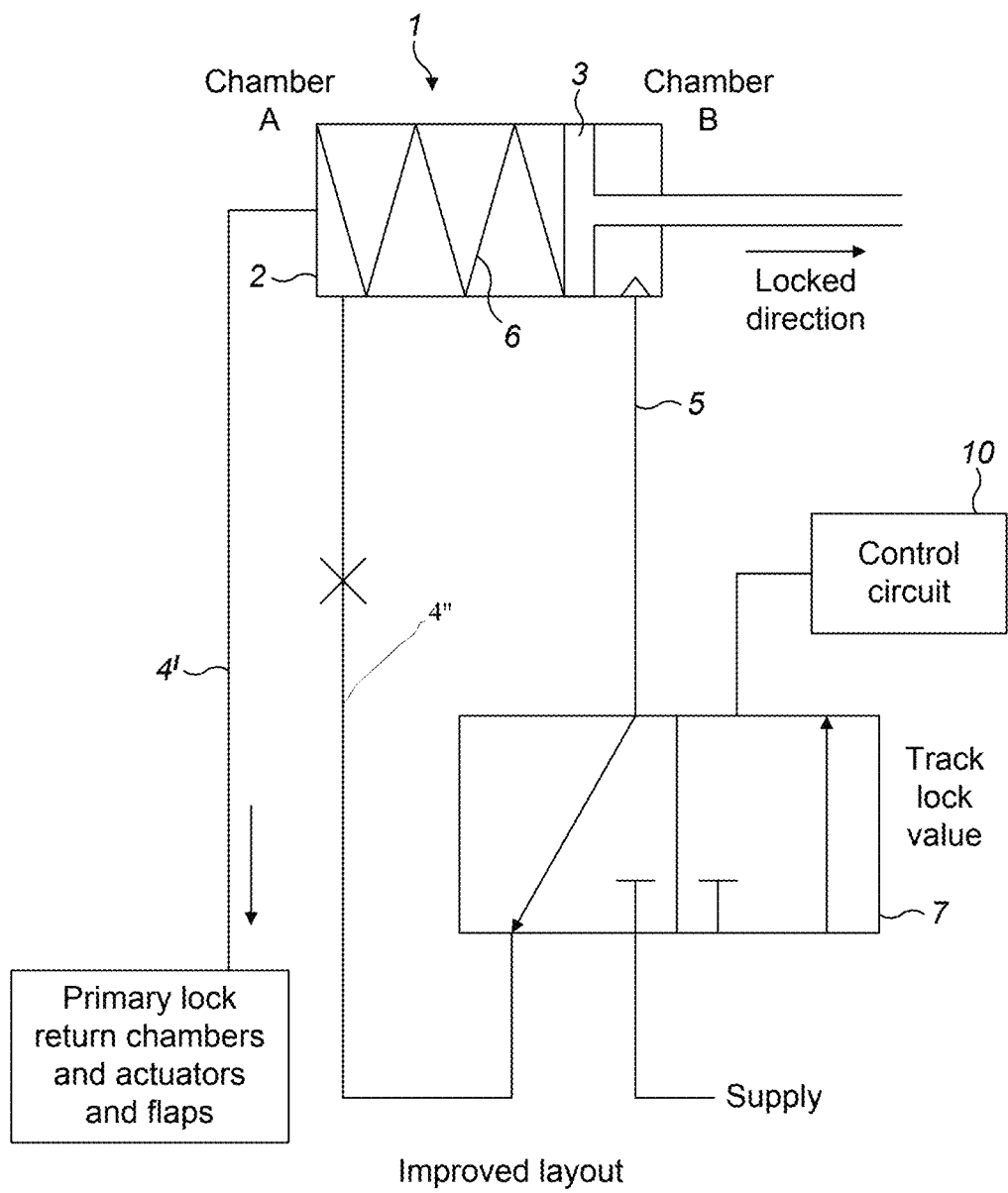
FIG. 2 shows a schematic view of a hydraulic lock according to the present invention.

In contrast, in the present invention, as seen in the example of FIG. 2, the return line comprises a first return line (4') that comes from the return chambers and directly to chamber A, and a second return line (4") that then goes from the chamber A to the lock valve.

Figure 1:
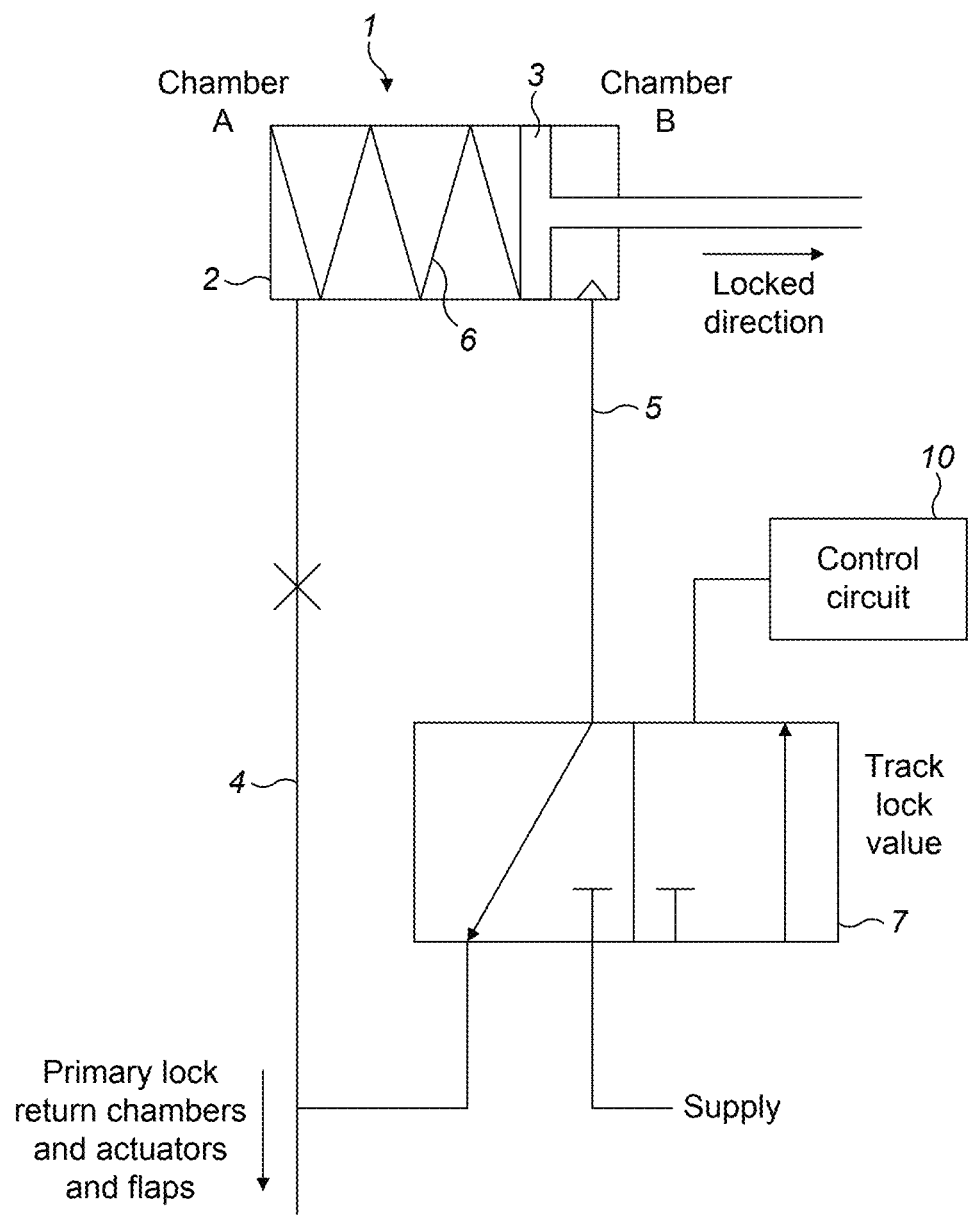
FIG. 1 shows a schematic view of a conventional hydraulic lock for a thrust reverser.

If, in this case, a rupture occurs at X, the high system pressure remains in chamber A from the return line and although the pressure in chamber A may drop slightly it will still be higher than that in chamber B. The pressure in chamber B will not increase as in the arrangement of FIG. 1 because the high system pressure from the return line will not raise the pressure in the control line. Thus, the lock will remain locked. Even if the biasing spring fails, the lock will remain locked due to the pressure from the return line being applied to Chamber A despite the rupture. Simply put, because the high pressure hydraulic fluid from the return chamber has to pass first, through Chamber A of the lock, before reaching the rupture point, the pressure force engaging the lock during a rupture exceeds any transient control pressure trying to release it.

Accordingly, the invention provides a lock that has improved hydraulic and mechanical integrity in case of bursts or ruptures in the hydraulic lines and safety can be assured even in the case of failure of the lock biasing spring.

The invention claimed is:

1. A hydraulically actuated mechanical lock assembly of a thrust reverser system for an aircraft, the assembly comprising:

a lock actuator consisting of:

a lock housing having a first end chamber (A) and a second end chamber (B);

a first return line connected between a high pressure fluid return chamber and the first end chamber (A);

a control line connected to the second end chamber (B);

a second return line connected between the first end chamber (A) and the second end chamber (B);

a moveable element mounted in the lock housing; and a lock valve arranged in the fluid flow between the housing and the control line to control the flow of hydraulic fluid into the first end chamber (A) and the second end chamber (B);

wherein when the lock assembly is commanded to be in a lock position, the lock valve is positioned to fluidly connect the first end chamber (A) and the second end chamber (B) via the control line and the second return line, and the housing is arranged to receive hydraulic fluid at the first end chamber (A) from the high pressure fluid return chamber via the first return line, and when the lock assembly is commanded to be in an unlock position, the lock valve is positioned to connect the second end chamber (B) to a supply of high pressure fluid via the control line, such that high pressure fluid is supplied from the supply to the second end chamber (B) via the control line to cause the movable member into the first end chamber (A); and whereby when the lock assembly is in the lock position, the first end chamber (A) remains fluidly connected to the high pressure fluid return chamber via the first return line even if the second return line ruptures;

wherein the second end chamber B is connected to the high pressure fluid return chamber via the first end chamber A such that fluid flow between the high pressure fluid return chamber and the second end chamber must pass through the first end chamber.

2. The lock assembly of claim 1, wherein the moveable element is a piston.

3. The lock assembly of claim 1, wherein the lock valve is responsive to unlocking control signals from an aircraft thrust reverser control circuit to apply a supply pressure to the second end chamber (B).

4. A thrust reverser system for an aircraft comprising:

one or more moveable flaps;

one or more actuators to cause movement of the flaps;

a control circuit for triggering movement of the flaps, and a hydraulically actuated mechanical lock assembly as recited in claim 1.

* * * * *